Nov. 30, 1948.                R. SIMMON ET AL                 2,455,142
                  CONDENSER TYPE PHOTOGRAPHIC ENLARGER
                       WITH EXCHANGEABLE LENSES AND
                         ADJUSTABLE LAMP HOUSING
Filed Feb. 26, 1946                                    3 Sheets-Sheet 3
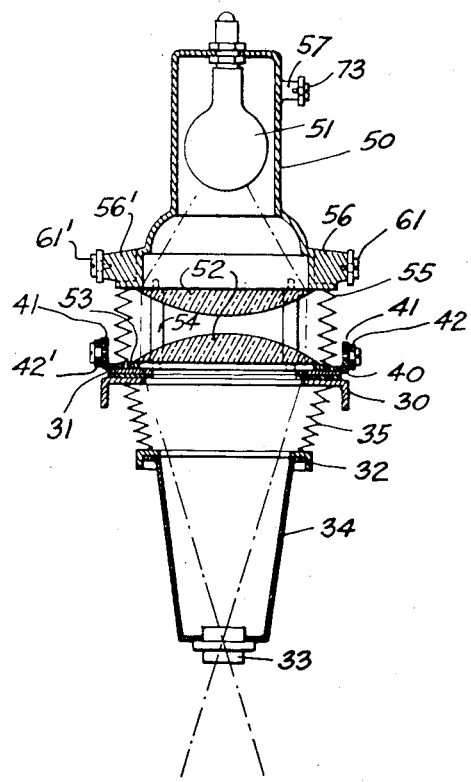
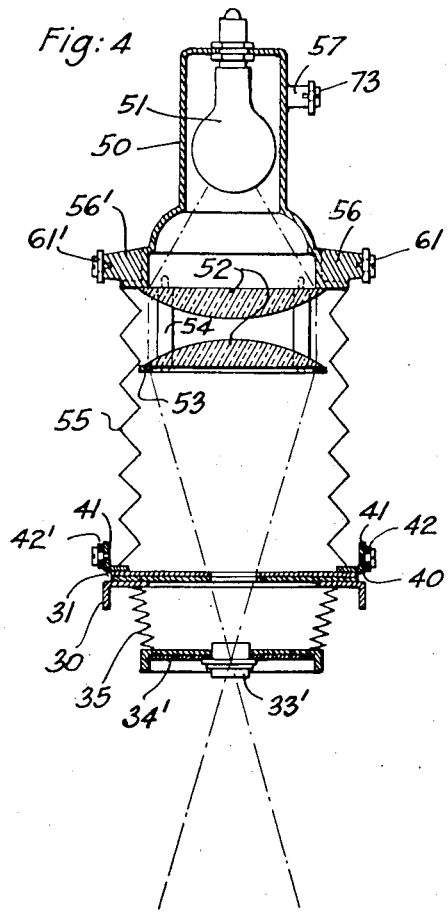
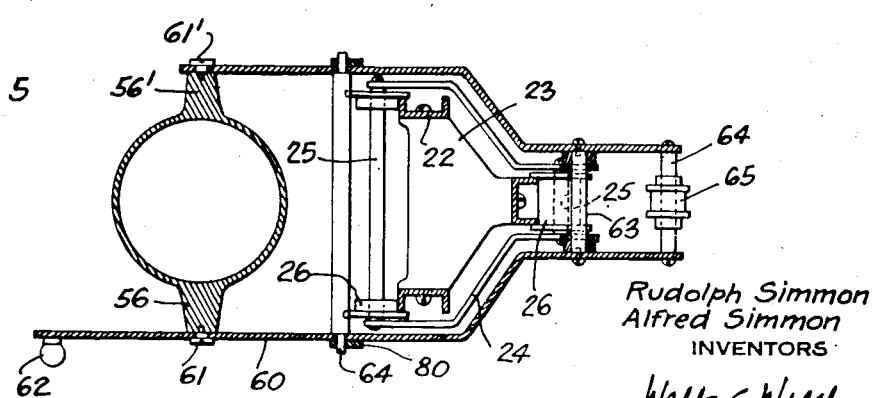
Rudolph Simmon
Alfred Simmon
INVENTORS
BY *Walter E. Wallheim*
ATTORNEY Patented Nov. 30, 1948

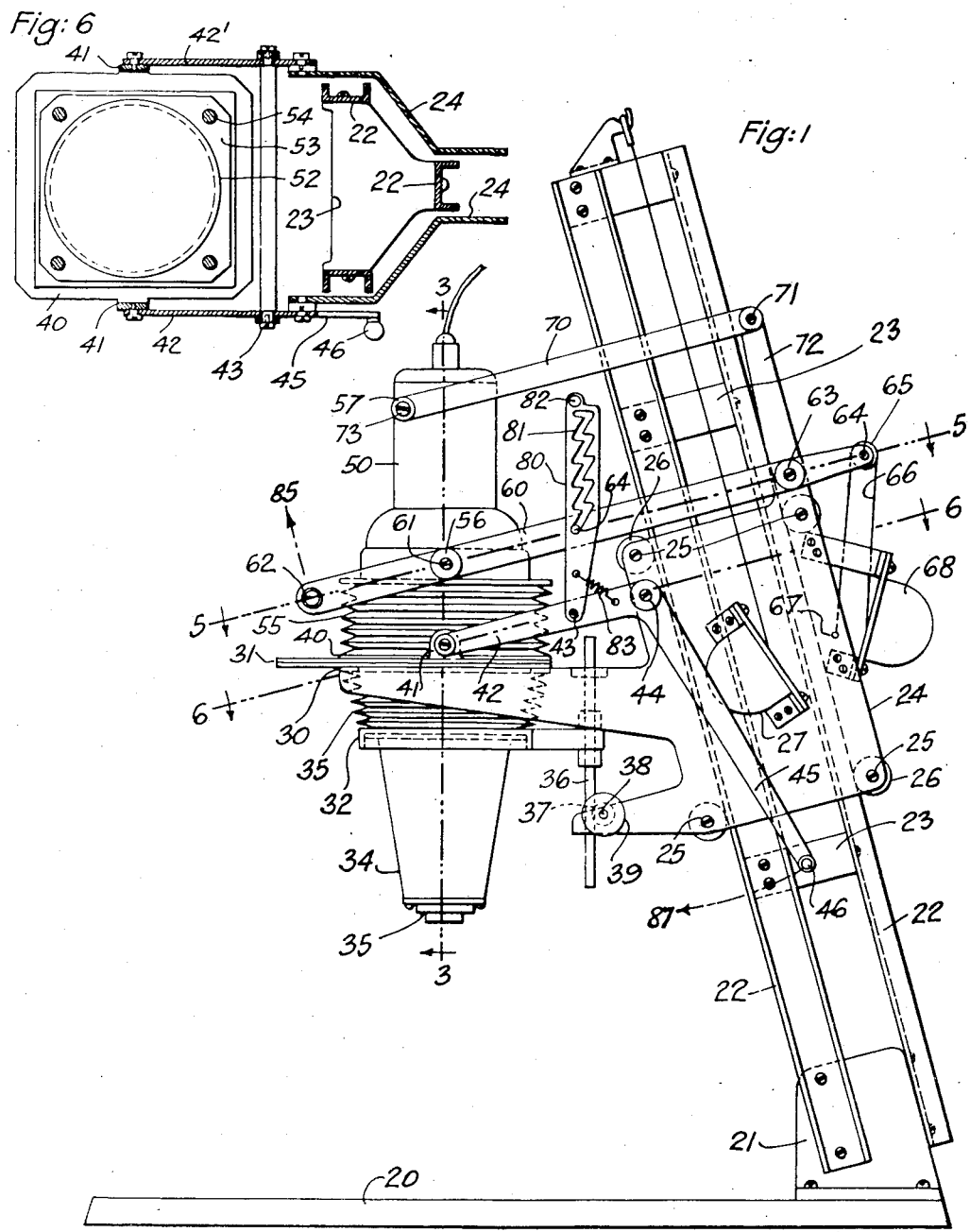

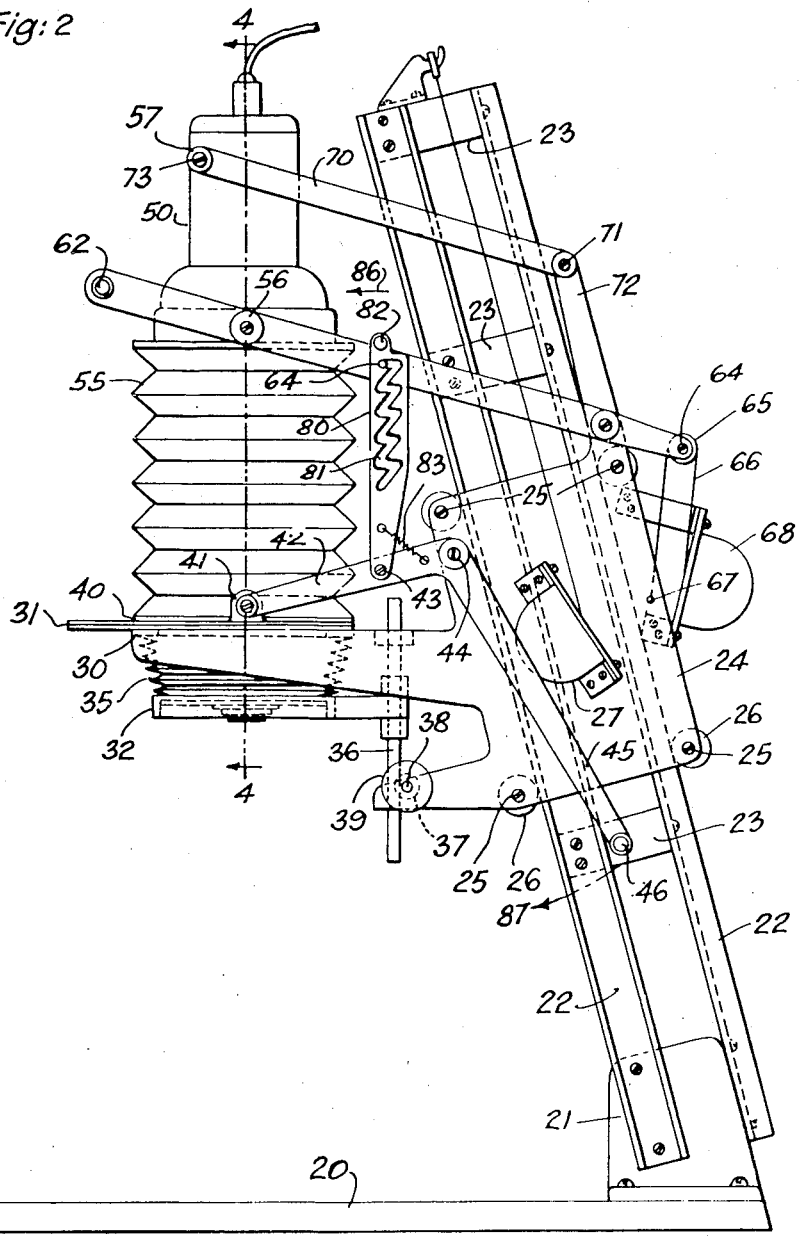

2,455,142

UNITED STATES PATENT OFFICE 2,455,142

CONDENSER TYPE PHOTOGRAPHIC ENLARGER WITH EXCHANGEABLE LENSES AND ADJUSTABLE LAMP HOUSING

Rudolph Simmon and Alfred Simmon, Jackson Heights, N. Y., assignors to Simmon Brothers, Inc., Long Island City, N. Y., a corporation of New York Application February 26, 1946, Serial No. 650,294

4 Claims. (Cl. 88—24)

The object of this invention is an enlarger of the condenser type, and more specifically, an enlarger of the condenser type which can be used with enlarging lenses of different focal lengths without the necessity of changing condensers.

It is well known that the principal elements of a condenser type photographic enlarger, i. e., the source of light, the condenser, and the enlarging lens, must be so adjusted relative to each other that the rays of the lamp are focused by the condenser into, or at least substantially into, the pupil of the enlarging lens. Since it is desirable to employ for negatives of various sizes enlarging lenses of different focal lengths, means have to be provided to adjust the optical system accordingly. Heretofore the most frequently used expedient was simply to change condensers whenever enlarging lenses were changed. This, however, is objectionable since condensers are relatively expensive. Attempts to adjust the relative distance between lamp and condenser for this purpose have not been satisfactory, as was to be expected, because the distance from the lamp to the condenser would have to change by a relatively enormous distance in order to shift the point of correct position of the enlarging lens a relatively short distance and for short focus enlarging lenses the enlarging lens would approach the condenser so much that, even with a lamp position at infinity, correct conditions could not be obtained. A more promising expedient has been disclosed in Patents No. 2,239,760 and 2,222,185 issued to Rudolph Simmon where the relative position of the condenser and the enlarging lens is constant or substantially constant and where focusing is effected by shifting a negative stage between condenser and enlarging lens. It is, however, difficult to support a movable film stage with sufficient rigidity, and it is also difficult to adapt enlargers of this type to automatic focusing.

In the present invention this problem has been solved by keeping the film stage, on which the negative is positioned during exposure, stationary with respect to the projector carriage of the enlarger, by providing means to lift the lamp housing relative to this film stage until the proper optical conditions have been obtained, and by providing means to maintain the lamp housing in this elevated position during operation. The film holder is sandwiched during operation between a movable pressure plate and the aforementioned film stage in a manner which, as such, is well known. A separate lifting device is provided for this pressure plate in order to facilitate the insertion of the film holder. As an added improvement a mechanical interlock may be provided between the lifting mechanism for the pressure plate and the lifting mechanism for the lamp housing, by means of which the lamp housing may be lifted separately and independently of the pressure plate for optical adjustment, and pressure plate and lamp housing may be lifted together for the insertion of a film holder.

A preferred form of an enlarger built according to this invention is shown in the accompanying drawings in which Fig. 1 shows the enlarger as adjusted for a long focus lens;

Fig. 2 shows the enlarger as adjusted for a short focus lens;

Fig. 3 is a longitudinal sectional view along the plane of line 3—3 in Fig. 1;

Fig. 4 is a longitudinal sectional view along the plane of line 4—4 in Fig. 2;

Fig. 5 is a cross-sectional view along the plane of line 5—5 in Fig. 1; and

Fig. 6 is a cross-sectional view along the plane of line 6—6 in Fig. 1.

Like characters of reference denote similar parts throughout the various views and the following specification.

The enlarger as shown in Fig. 1 comprises a flat base 20, preferably made from plywood or the like on which a casting 21 is mounted. This casting forms the base of a supporting structure which comprises three U-channels 22 made from sheet steel or the like. These channels are connected to and reinforced by members 23. Slidably mounted on this supporting structure is a projector which consists of a carriage, a film stage, an adjustable lens support, a pressure plate with its lifting mechanism, a lamp housing with its lifting mechanism and an interlock between the two lifting mechanisms.

The projector carriage is formed by two sheet steel plates 24 which are connected by four bolts 25. These bolts serve at the same time as shafts for rollers 26 by means of which the carriage moves on the aforementioned U-channels 22. Fastened to these steel plates are springs 27 of the type commercially available as sash weight balances, by means of which the entire projector assembly is counter-balanced so that the operator can move it on the channels with ease and convenience. The film stage 30 is rigidly connected to the projector carriage and has in a well known manner a round or rectangular aperture as large as or larger than the largest negative which the enlarger is designed to accommodate. During operation the film holder 31 will be placed on this film stage. This film holder may be of any convenient construction and consists preferably of suitably shaped flat metal plates between which the photographic negative may be sandwiched. Negative holders of this type have, for example, been described in before mentioned Patents No. 2,222,185 and 2,239,760.

Below the film stage is a lens support 32 which is preferably made from an aluminum casting or the like and which is adapted to receive enlarging lenses of different focal lengths. As can be seen in Fig. 1, an enlarging lens 33 of a relatively long focal length is supported by a lens cone 34 which, in turn, is fastened to lens support 32. It is desirable to make the length of the lens cone 34 long for long focus lenses and short for short focus lenses and, for the lens of shortest focal length that will be used in this enlarger, the lens cone may even be reduced to a simple flat plate as shown in Fig. 2.

The lens support 32 is connected to the film stage in a well known manner by flexible but extensible means such as bellows 35 made from leather or the like. The distance of the lens support 32 from the film stage must be adjustable for focusing purposes, and these adjusting means may be any of the well known focusing devices used for this purpose. Merely as a representative example, the lens support 32 is shown connected to a guide rod 36 which, in turn, may be actuated by a friction wheel 37. This friction wheel is mounted on shaft 38 which is turned by handwheel 39. It is, of course, perfectly conceivable to substitute an autofocus arrangement for this manual arrangement.

Above the film stage there is a pressure plate 40, which, of course, must also have a round or rectangular aperture as large as or larger than the largest negative. This pressure plate has two up-turned lugs 41 which are supported rotatably by two parallel levers 42 and 42'. Lever 42 has a pivot 43 which supports the interlock between the two lifting mechanisms for the pressure plate and lamp housing, respectively, which will be described later, and it is rotatably supported by a pivot 44 which is mounted to the side plate 24 of the projector carriage. At least one of the levers 42 has an extension 45 which terminates in a knob or handle 46 by means of which the operator may actuate the lifting mechanism for the pressure plate.

The lamp housing comprises a main part 50, made from cast aluminum or the like, within which the lamp 51 is mounted and to the lower end of which a condenser is attached. The condenser comprises two condenser lenses 52, the upper one of which is mounted directly to part 50 and the lower one of which is supported by an apertured plate 53. The apertured plate 53 is connected to part 50 by four studs 54. The lower surface of part 50 is connected to the pressure plate 40 by another bellows 55 which surrounds the condenser assembly. The lamp housing has three lugs by means of which it is supported by its lifting mechanism, two lower lugs 56 and 56' and one upper lug 57. In a lamp housing of this kind actually suitable ventilating devices must be provided to prevent overheating of the housing by the lamp, but devices of this type are well known in the art and have, therefore, been omitted.

The lamp housing is supported by a lifting mechanism which comprises essentially a trunnion 60 which supports two pivots 61 and 61' which are fastened to the aforementioned lugs 56 and 56' of the lamp housing. This trunnion has preferably a handle 62 attached to its front end for operating purposes. The trunnion is supported by a shaft 63 which is rotatably mounted upon the two steel plates 24 forming the projector carriage. About midway between points 63—62 a pin 64 is fastened to the trunnion which engages the interlock which will be described later. Since the weight of the lamp housing is appreciable, it may be more conveniently handled by providing a counter-balance for part of its weight. For this purpose, the trunnion is rearwardly extended beyond point 63 and carries shaft 64 which, in turn, supports a roller 65. Wound around this roller 65 is a tape 66 of a spring 68 which again is of the type commercially available as sash weight balances. The free end of this spring is fixedly attached to point 67 of the projector carriage. It will be clear that in this manner twice the force of the spring will act on point 64. By this expedient the distance between points 63—64 can be made smaller and a more compact unit may be obtained.

In addition to the trunnion 60 means must be provided to maintain the axis of the lamp housing vertical at all times. These means comprise simply an additional lever 70, one end of which is rotatably supported by a pivot 71 which, in turn, is attached to an extension 72 of the steel plate 24 which forms part of the projector carriage. The other end of lever 70 is attached to a pivot 73 which is fastened to the aforementioned projection 57 of the lamp housing part 50. The length of link 70, i. e., the distance between point 71 and 73 is, of course, the same as the distance between point 63 and 61 and the distance between point 63 and 71 is the same as the distance between point 61 and 73. The four points 71, 63, 61 and 73 form, therefore, a parallelogram and this folding parallelogram movement enables one in a well known manner to raise the lamp housing parallel to itself. The parts of the lamp housing describe flat arcs closely approximating a straight line. Compared to other possible means to raise the lamp housing strictly in a straight line, this movement has the advantage of simplicity and comparative freedom from friction.

The position of the lamp housing relative to the film stage depends upon the focal length of the enlarging lens which the operator happens to use and, as pointed out above, the various parts must be so adjusted that the rays of the lamp are focused by the condenser substantially into the pupil of the enlarging lens. Referring to Figs. 1 and 3, and 2 and 4, respectively, this enlarger is shown as equipped with and adjusted for a long focus lens in Figs. 1 and 3, and a short focus lens in Figs. 2 and 4. The long focus lens 33 is mounted on a relatively long lens cone 34, whereas a short focus lens 33' is mounted either on a shorter cone, the length of which would depend on its focal length, or in an extreme case, as shown, simply on a flat board 32'. In the case of Fig. 3, the lamp housing assumes the lowest possible position, i. e., plate 53 which supports the lower condenser lens is almost, but not quite, in contact with the film holder 31; it is preferable to avoid actual contact and leave the compression of the film holder always to the pressure plate 40 which has been designed for this purpose. In Fig. 4 the lamp housing has been lifted to its highest position and it will be seen that the distance between the lens and the condenser lens is substantially the same in both cases.

The lamp housing will be lifted in the manner described for optical purposes, and the pressure plate will be lifted in the manner described for the insertion of a film holder upon the film stage. As a further improvement, there is provided an interlock between the two movements which makes it possible to provide two separate types of adjustment for the lamp housing, i. e., a first one by which the lamp housing may be lifted for optical purposes for a comparatively long distance, separately and independently from the pressure plate, and a second one in which the lamp housing and the pressure plate may be lifted together for a relatively short distance for the insertion of a film holder. A preferred execution of this idea is illustrated in Figs. 1 and 2. The interlock in this case comprises a steel plate 80 into which a slot 81 has been cut. This slot has a sawtooth-like shape and receives the aforementioned pin 64 which is fastened to trunnion 60. The lower end of plate 80 is rotatably connected by pivot 43 to lever 42. In order to facilitate handling, the upper end of plate 80 is equipped with a knob 82 or the like. A small spring 83 is provided which has a tendency to turn part 80 in a clockwise direction.

The function of this interlock is as follows: If the operator wants to adjust the lamp housing in an upward direction, he merely takes hold of handle 62 and lifts trunnion 60 upwardly, i. e., in the direction of arrow 85. In this manner, the lamp housing may be lifted step by step and pin 64 will rest consecutively on each of the horizontal surfaces of the subsequent sawteeth until eventually it arrives in the highest position shown in Fig. 2. If the operator wants to lower the lamp housing, he takes hold of knob 82 and moves part 80 slightly in the direction of arrow 86. This movement will cause pin 64 to leave the horizontal face of the uppermost tooth, slip down the inclined part of the sawtooth shaped slot and come to rest upon the horizontal face of the next sawtooth. In this manner, the lamp housing may be released step by step, from one tooth to the next, until it has reached the position shown in Fig. 1. Due to the fact that the major part of the weight of the lamp housing has been counter-balanced in the manner described, this movement will take place fairly slowly and without undue shock.

If the operator wants to change the film holder, he takes hold of knob 46 and moves it in the direction of arrow 87. The lifting lever 42 thereby rotates slightly around its supporting pivot 44 and lifts lug 41 and thereby pressure plate 40. At the same time, pivot 43 is also lifted, although by smaller amount, and this lifting movement is by link 80 transferred to the pin 64 which is fastened to trunnion 60. This, in turn, lifts the entire lamp housing by a small distance and permits the insertion of the film holder without difficulty. Knob 46 is then released by the operator, permitting lever 42, and thereby pressure plate 40, to return to its original position. During the exposure the film holder is thereby sandwiched between film stage 30 and pressure plate 40. If desired, the aperture of the film stage 30 may be made circular and the film holder may be adapted to rotate around a vertical axis above this aperture, thereby permitting in a convenient manner the rotation of the projected enlarged image upon the enlarging easel.

It is obvious that many changes of form, proportions and minor details of construction may be resorted to without departing from the principles or sacrificing any of the advantages of the invention as defined in the appended claims.

What we claim as new, is:

1. A photographic enlarger, comprising a flat base, a substantially vertical supporting structure mounted on said base, and a projector assembly, said projector assembly comprising a carriage adapted to slide on said supporting structure, an apertured stage in said carriage for the support of one of a plurality of negative holders for negatives of different dimensions, a lens support disposed beneath said stage, connected therewith by light-tight but extensible means and adapted to receive one of a plurality of enlarging lenses of different focal lengths, a focusing mechanism adapted to adjust the distance between said stage and said lens, an apertured pressure plate disposed above said stage and adapted to rest during operation on said negative holder, a lamp housing, a lamp and a rigid condenser, said lamp and condenser having a fixed distance relative to each other and being stationarily mounted with respect to said housing, said housing disposed above said pressure plate and connected thereto by light-tight but extensible means, mechanism to lift said pressure plate for placing a negative holder on said stage, and mechanism to lift said lamp housing including means to maintain said lamp housing in an elevated position, whereby the elevation of said lamp housing above said stage can be so adjusted that the rays of said lamp are focused by said condenser substantially into the pupil of said enlarging lens, including a link connecting both said lifting mechanisms for simultaneous operation.

2. A photographic enlarger according to claim 1, including a link connecting both said lifting mechanisms for simultaneous operation, and means to adjust the effective length of said link.

3. A photographic enlarger according to claim 1, said lifting mechanism for said lamp housing including separate means to lift said lamp housing a relatively long and a relatively short distance, respectively, said means to lift said lamp housing a long distance being independent of said first named lifting mechanism for said pressure plate and including means to maintain said lamp housing in an elevated position whereby the rays of said lamp are focused by the condenser substantially into the pupil of the enlarging lens, said means to lift said lamp housing a short distance being operatively connected to said first named lifting mechanism for said pressure plate whereby said pressure plate and lamp housing may be lifted simultaneously for placing of a negative holder on said stage.

4. A photographic enlarger according to claim 1, one of said lifting mechanisms being equipped with a projection, and the other of said lifting mechanisms supporting a pivoted connecting link, said link being a flat plate having a slot with a plurality of sawtooth shaped formations, each sawtooth having one substantially horizontal side adapted to be in operative contact with said above mentioned projection.

RUDOLPH SIMMON.
ALFRED SIMMON.

REFERENCES CITED

The following references are of record in the file of this patent:

UNITED STATES PATENTS

| Number | Name | Date |
| --- | --- | --- |
| 1,932,701 | Kurze | Oct. 31, 1933 |
| 2,229,761 | Mueller | Jan. 28, 1941 |
| 2,233,744 | Meder | Mar. 4, 1941 |
| 2,249,228 | Rogers | July 15, 1941 |
| 2,312,562 | Leonard | Mar. 2, 1943 |
| 2,344,558 | Moore | Mar. 21, 1944 |